United States Patent
Chen et al.

(10) Patent No.: US 7,869,665 B2
(45) Date of Patent: Jan. 11, 2011

(54) COMPOSITE METHOD AND APPARATUS FOR ADJUSTING IMAGE RESOLUTION

(75) Inventors: Fang-Chu Chen, Hsinchu (TW);
Chia-Hao Chang, Hsinchu (TW);
Wen-Hao Chung, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1201 days.

(21) Appl. No.: 11/443,401

(22) Filed: May 31, 2006

(65) Prior Publication Data
US 2006/0274094 A1    Dec. 7, 2006

Related U.S. Application Data

(60) Provisional application No. 60/686,408, filed on Jun. 2, 2005.

(30) Foreign Application Priority Data
Dec. 27, 2005    (TW)    .............................. 94146855 A

(51) Int. Cl.
G06K 9/32    (2006.01)
G06K 9/48    (2006.01)
G09G 5/00    (2006.01)

(52) U.S. Cl. .................. 382/300; 382/199; 345/611; 345/660

(58) Field of Classification Search ............... 382/199, 382/298–300; 345/698–699; 348/556, 561
See application file for complete search history.

(56) References Cited

U.S. PATENT DOCUMENTS

| | | | | |
|---|---|---|---|---|
| 5,054,100 A * | 10/1991 | Tai | .............................. | 382/300 |
| 5,343,238 A * | 8/1994 | Takata et al. | ................. | 348/556 |
| 5,446,804 A * | 8/1995 | Allebach et al. | ............. | 382/298 |
| 5,500,744 A * | 3/1996 | Sabath | ....................... | 358/3.07 |
| 5,524,074 A * | 6/1996 | Massie | ......................... | 381/62 |
| 5,850,487 A * | 12/1998 | Takane et al. | ................ | 382/298 |
| 6,002,811 A * | 12/1999 | Koshimizu et al. | .......... | 382/298 |
| 6,094,511 A * | 7/2000 | Metcalfe et al. | .............. | 382/260 |
| 6,175,659 B1 * | 1/2001 | Huang | .......................... | 382/266 |
| 6,366,292 B1 * | 4/2002 | Allen | ........................... | 345/611 |
| 6,529,642 B1 * | 3/2003 | Lai et al. | ...................... | 382/298 |
| 6,573,940 B1 * | 6/2003 | Yang | ........................... | 348/441 |
| 6,714,692 B1 * | 3/2004 | Kim et al. | .................... | 382/299 |
| 7,200,278 B2 * | 4/2007 | Long et al. | ................... | 382/266 |

FOREIGN PATENT DOCUMENTS

| | | |
|---|---|---|
| JP | 2005-135410 A | 5/2005 |
| TW | 473695 | 1/2002 |

* cited by examiner

*Primary Examiner*—Vu Le
*Assistant Examiner*—Andrae S Allison
(74) *Attorney, Agent, or Firm*—Rabin & Berdo, P.C.

(57) ABSTRACT

A composite method and apparatus for adjusting an image resolution are provided, which are applied for adjusting a digital image or de-interlace scanning, especially for achieving an edge enhancing effect. The composite method may include: obtaining an original image and a scaling factor for adjustment S; after that, detecting an edge of the original image and generating an edge map for the original image; then, calculating and generating an adjusted image with a scaling factor equal to $2^n$; and finally, converting the adjusted image into a final image, which is S times the original one.

22 Claims, 6 Drawing Sheets

COMPOSITE METHOD AND APPARATUS FOR ADJUSTING IMAGE RESOLUTION

CROSS-REFERENCE TO RELATED APPLICATIONS

This non-provisional application claims priority under 35 U.S.C. §119(a) on Patent Application No(s). 094146855 filed in Taiwan, R.O.C. on Dec. 27, 2005 and Application No(s). 60/686,408 filed in United States on Jun. 2, 2005, the entire contents of which are hereby incorporated by reference.

BACKGROUND OF THE INVENTION

1. Field of Invention

The present invention relates to a method and apparatus for adjusting an image resolution, and more particularly to a method and apparatus for enabling a digital image still to achieve an edge enhancing effect through a composite process, even after the digital image has been scaled or de-interlace scanned.

2. Related Art

In recent years, due to technical breakthroughs, the yields of liquid crystal panel (LCD) manufacturers have been continuously increasing. Therefore, the LCD is not limited to be used in notebooks but has also begun to be used in desktops, and has become the mainstream of the market. What's more, LCD manufacturers have begun to manufacture large-size panels to meet the demands of high definition televisions (HDTVs).

However, although by name called high definition televisions (HDTVs), the high definition quality of a frame mainly depends on the source itself. If the source signals are analog signals, when the analog signals are converted to digital signals, the frame is more likely to be distorted. Preferably, one point on the frame is directly displayed by a corresponding point on a screen, which results in the best displaying effect, i.e., directly displaying pixels. However, since resolutions of HDTVs are different due to different sizes, and even the resolutions of the sources of display frames may not be the same, HDTVs often cannot show the deserved frame quality.

As shown in FIG. 1, it is assumed that the resolution of a source image 210 is $N_x \times M_y$, and the resolution of an HDTV image 220 is S times of that of the source image, supposing $N_s \times M_s$. Generally, the results of $N_s/N_x$ and $M_s/M_y$ cannot be multiples of 2. FIG. 2 is a schematic view of the conversion of corresponding pixel values of the source image 210 and the HDTV image 220. Provided that the resolution of the source image 210 is 4×4, and the resolution 220 of the HDTV image is 5×5, it can be seen that the corresponding pixel values are substantially different due to the different resolutions. If inappropriately treated, not only does the edge become fuzzy, but also the whole frame appears unsmooth.

SUMMARY OF THE INVENTION

In view of the above problems, an object of the present invention is to provide a composite method and apparatus for adjusting an image resolution. A frame is firstly edge detected to find out a true edge, and then the non-edge part is calculated, so as to achieve an edge enhancing effect.

According to one embodiment of the present invention, the composite method for adjusting an image resolution disclosed by the present invention at least comprises the steps as follow.

Firstly, the pixel values for each point of an original image are obtained from a signal source. Then, the edge of the original image is captured with an edge detection algorithm. An edge map for the original image is generated in a memory for recording the position of the edge. Next, the scaling factor for adjustment S of the original image is obtained, i.e., the multiple between the resolution of the HDTV and that of the source image. After that, an adjusted image with a scaling factor equal to $2^n$ is calculated and generated through an interpolation method, wherein n is an integer that makes $S/2^n$ closest to 1. And finally, the adjusted image is converted into a final image, which is S times the original one.

The features and practice of the present invention will be illustrated below in detail through preferred embodiments with reference to the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

The present invention discloses a composite method and apparatus for adjusting an image resolution. In the following detailed illustration of the present invention, various specific details will be described to provide an overall illustration of the present invention. However, those skilled in the art can implement the present invention without referring to the specific details, or implement the present invention with alternative elements or method. Under other circumstances, the known methods, procedures, members, and circuits will not be illustrated in detail, so as to avoid unnecessarily confusing the focus of the present invention.

In order to prevent the edge of the source image from becoming fuzzy, unclear, or even unsmooth after having been adjusted according to the resolution of an HDTV, the edge of the source image is found in the present invention through an edge detection algorithm, such as a Sobel method, a Laplace method, a Robert method, or a second order method. The definition of the edge is maintained effectively through the $2^n$ magnitude scaling method, and the final resolution is achieved through a bilinear algorithm, i.e., the so-called composite method for adjusting image solution, wherein the value n is determined to make the value $2^n$ being closest to the image scaling factor S; and the proportion of the bilinear algorithm is equal to $S/2^n$.

During implementation, the original image is divided into multiple blocks. The data of each block is loaded into a memory. Each block is used to read each image pixel line by line into the memory for being processed.

Figure 4:
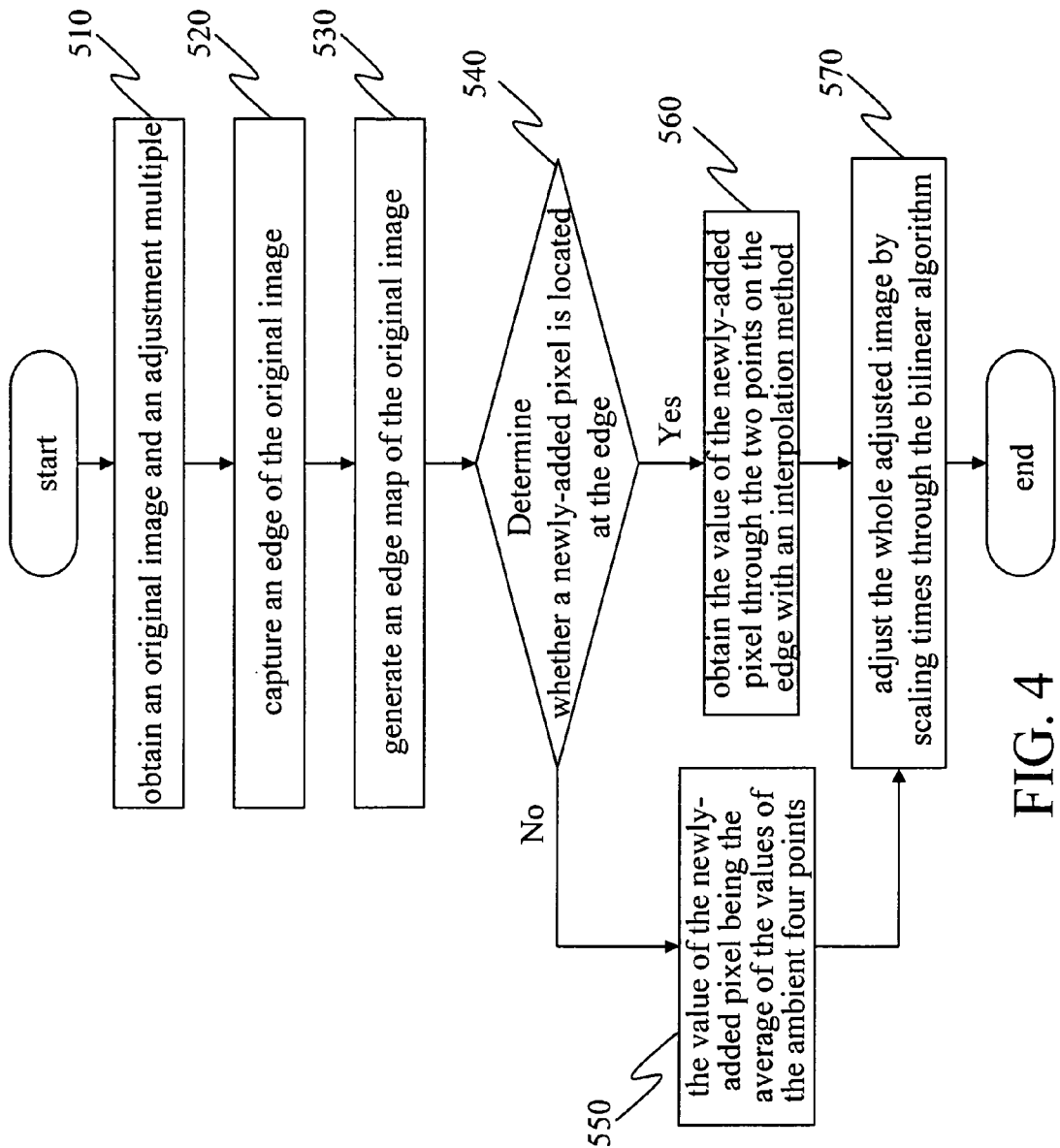
FIG. 4 is a flow chart of the method of one embodiment of the present invention.

Therefore, referring to FIG. 4, it is the flow chart of the method of one embodiment of the present invention. Firstly, the pixel values of each point of the original image are obtained from the signal source end by a chip processing module; and according to the resolution of the original image and the new resolution, the scaling factor for adjustment S there-between is calculated (Step 510). Supposing that the horizontal resolution of the original image is 720 and the vertical resolution is 480, when the horizontal resolution of the HDTV is 1920, the horizontal adjustment multiple is 2.67 (1920/720). Additionally, if the vertical resolution of the HDTV is 1080, the vertical adjustment multiple is 2.25 (1080/480).

Then, the edge of the original image is captured through the edge detection algorithm (Step 520). Next, an edge map of the original image is generated in the memory. The edge map is a 720×480 table, taking that of the above embodiment as an example, and the internal elements are binary codes, and the internal element being marked as 1 indicates that the point with the corresponding position is located on the edge. When $2^n$ times enlargement is performed, taking the prior embodiment as an example, n is set to 1, i.e., the point will be enlarged by a factor of two, and then bilinear enlargement for 2.76/2 and 2.25/2 is conducted, respectively.

Figure 1:
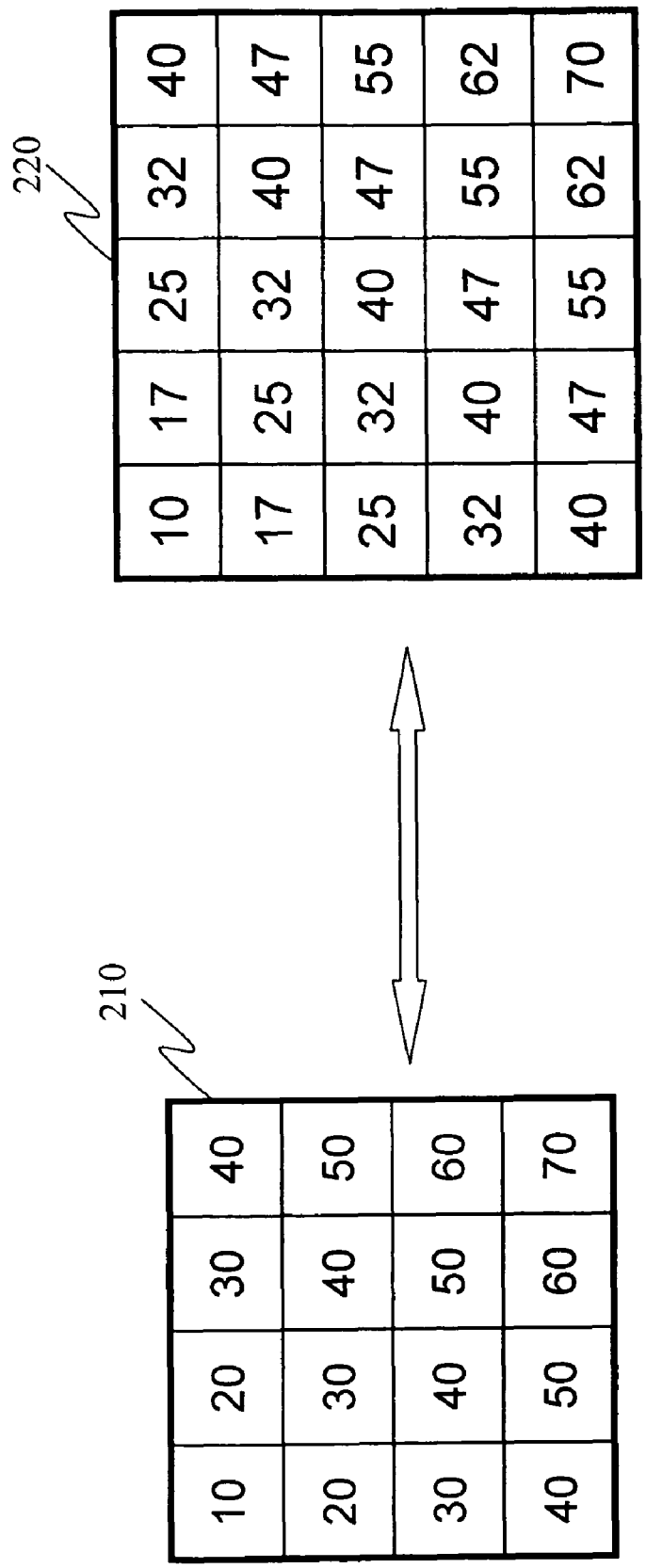
FIG. 1 shows an example of converting the corresponding pixel values of the source image and the HDTV.
Figure 2:
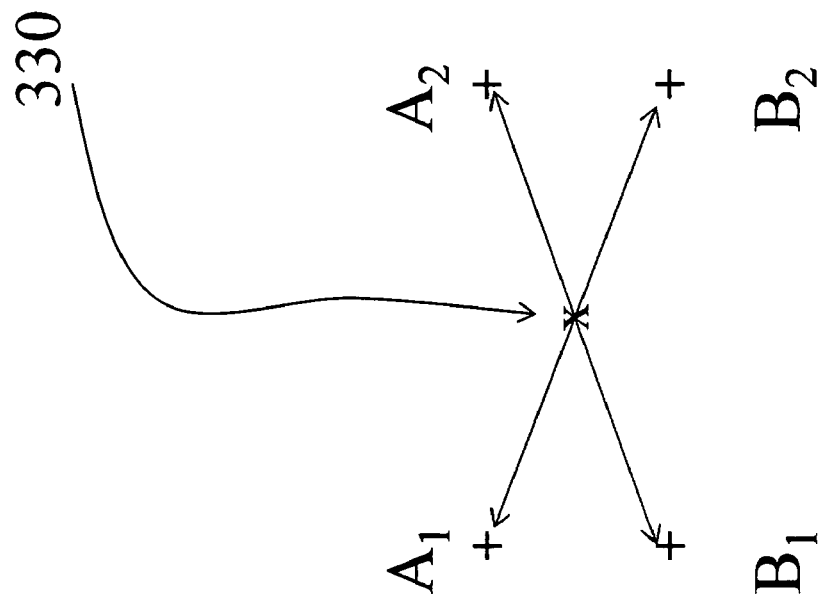
FIG. 2 is an embodiment of a newly-added pixel with four nearest points.
Figure 3:
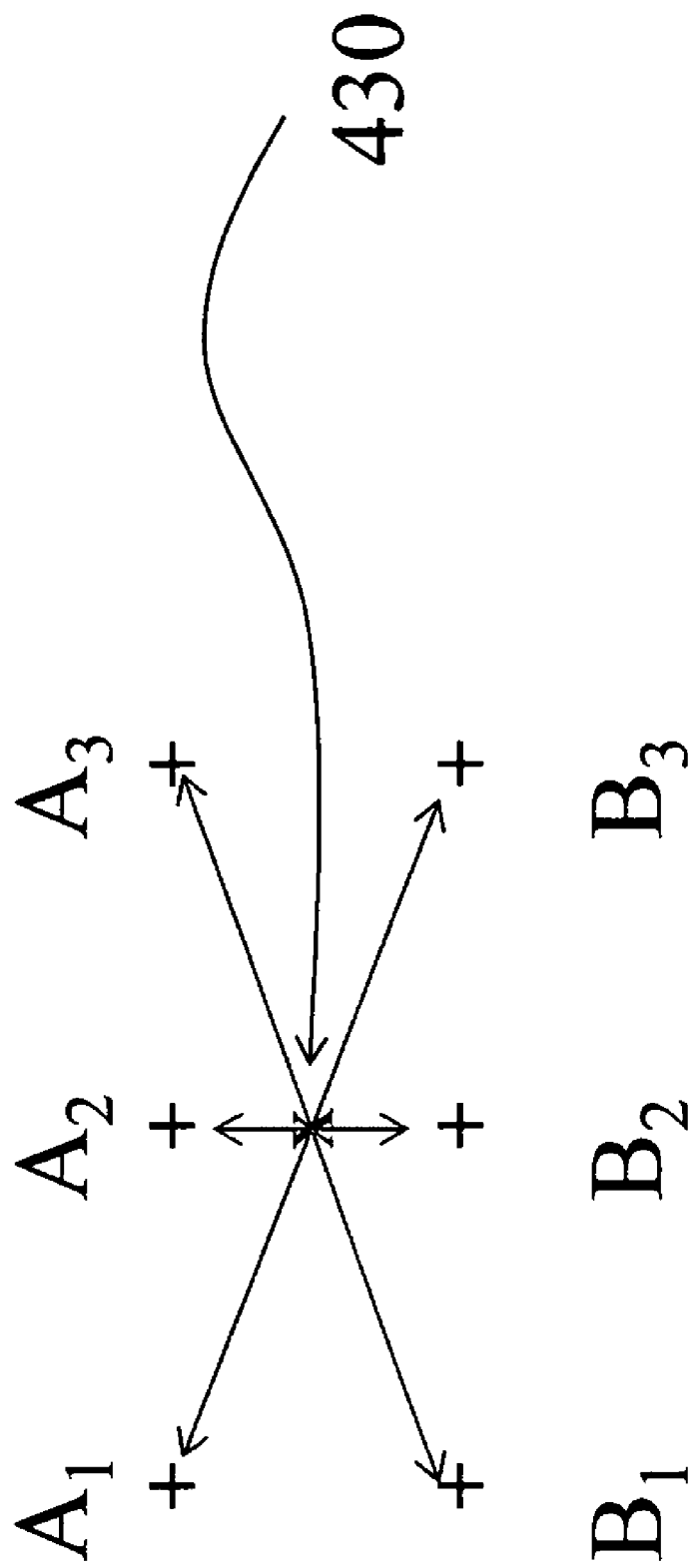
FIG. 3 is another embodiment of a newly-added pixel with six nearest points.
Figure 5:
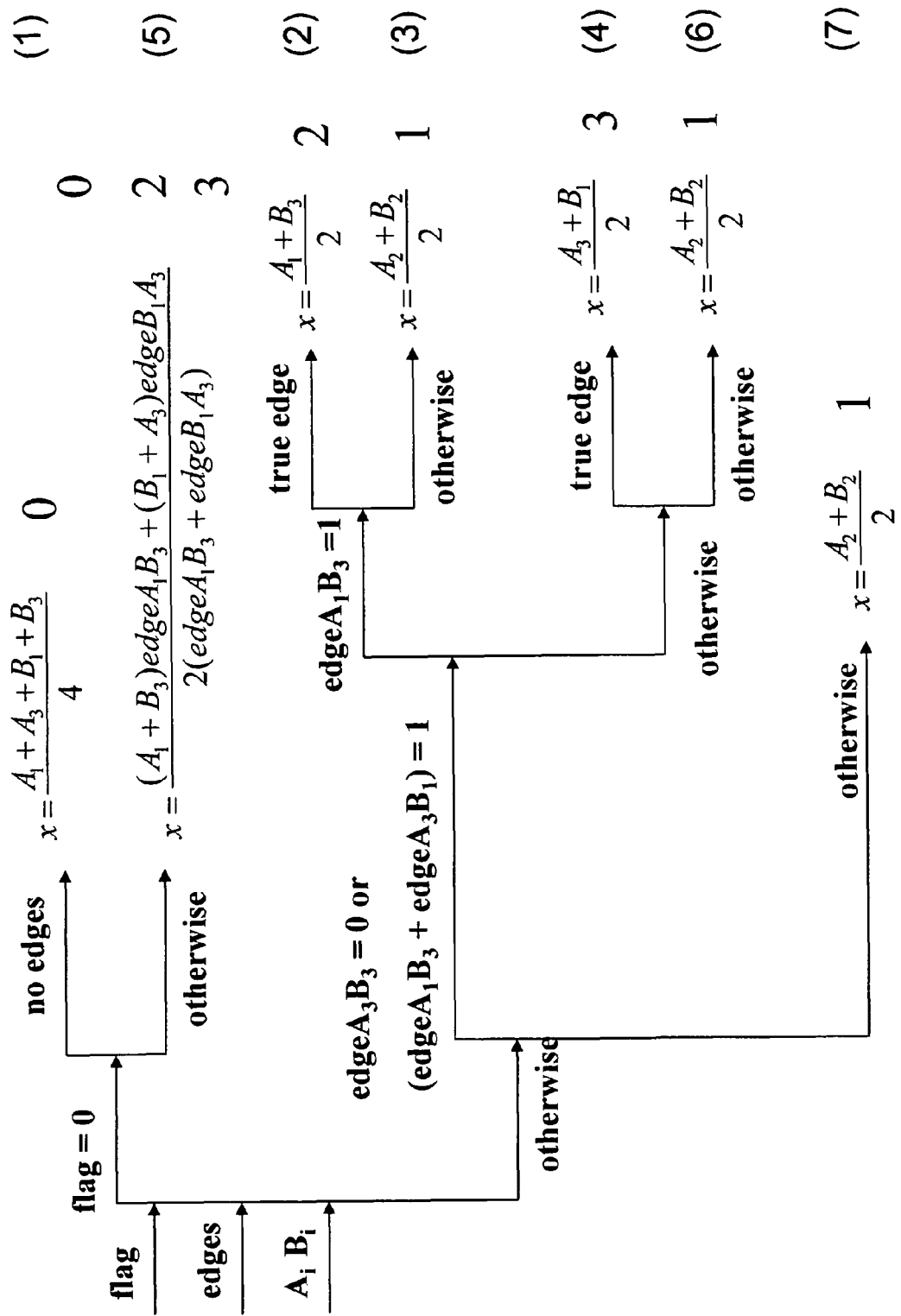
FIG. 5 is a decision tree of formulas for calculating a newly-added pixel in the present invention.

When two times enlargement is performed, the neighboring points of the point to be interpolated are determined first, as shown in FIG. 2 or FIG. 3. As for FIG. 2, the flag of FIG. 5 is set to 0, and as for FIG. 3, the flag of FIG. 5 is set to 1. Therefore, subsequently, as shown in FIG. 2 or FIG. 3, provided that the central point x is the newly-added pixel 430 after the image has been adjusted, whether the point x is located on the edge can be determined according to the edge map generated after the image is recorded and adjusted in Step 530 (Step 540). When the point x of the newly-added pixel 430 is determined not to be located in any edge, if the flag is equal to 0, the average of the ambient four points is regarded as the value of a newly-added pixel 330 through the algorithm of Formula (1) (Step 550); and if the flag is equal to 1, the average of the top point and bottom point is regarded as the value of the newly-added pixel 430 through the algorithm of Formula (6) (Step 550).

Figure 6:
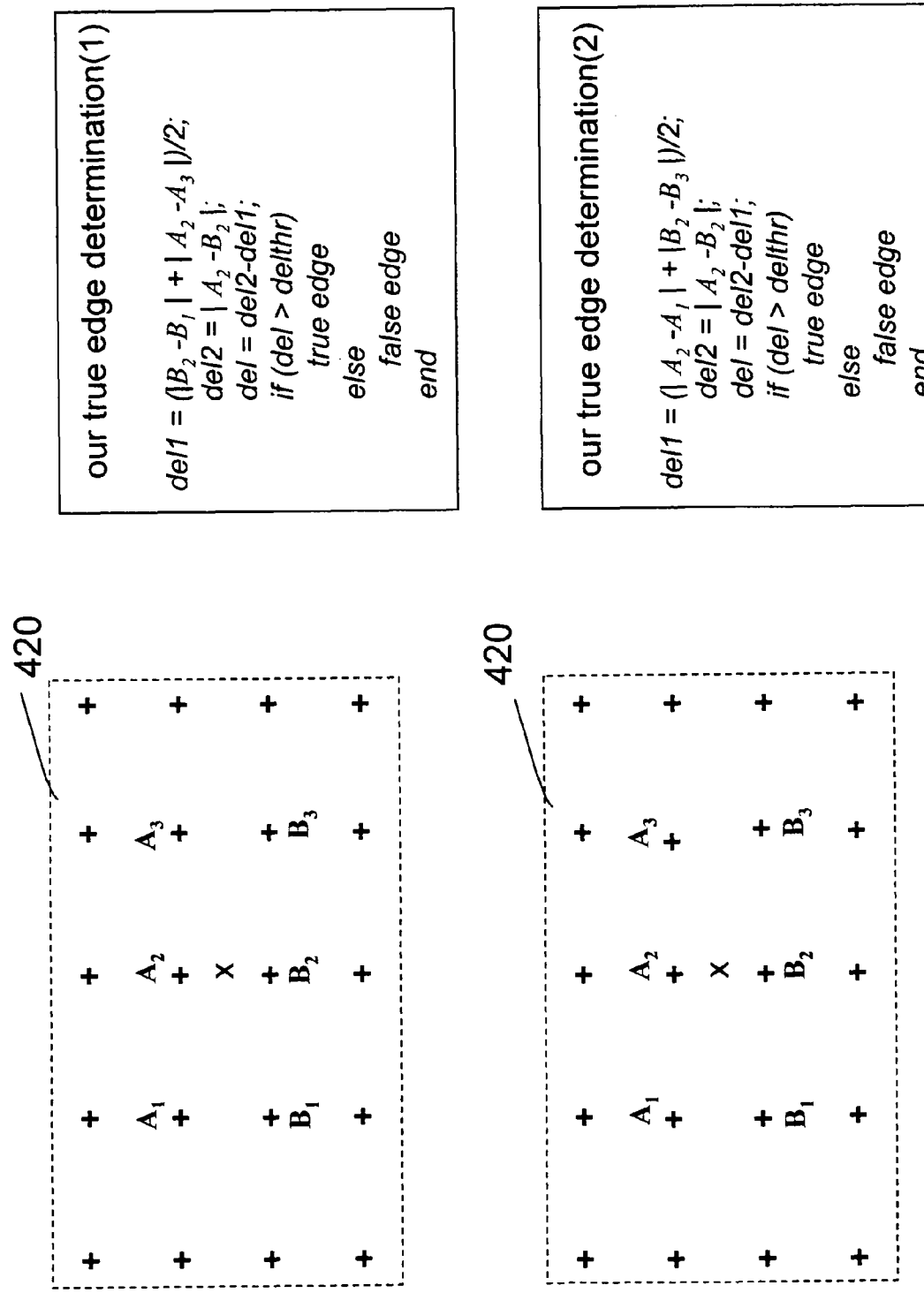
FIG. 6 is a method for determining whether the edge is true or false in the present invention.

As shown in FIG. 5, whether or not to determine an edge or an edge direction is determined by the values in the edge map of the binary codes generated through the edge detection algorithm. If the values of Point $A_1$ and Point $B_3$ in the edge map of the binary codes are both 1, then edge $A_1 B_3$ is 1; otherwise, edge $A_1 B_3$ is 0, and so forth. In FIG. 6, if edge $A_1 B_3$ or edge $A_3 B_1$ is 1, whether the edge is a true edge or not must be further determined, so as to determine the final interpolation method.

The method for determining whether or not the edge is true is shown in FIG. 6. If the values of Point $A_1$ and Point $B_3$ in the edge map of the binary codes are both 1, i.e., edge $A_1 B_3$ is 1, with the algorithm on the right side of FIG. 5, that is, the average value of the differences of the pixel points on each side of the line $A_1 B_3$ is calculated and then compared with the difference between the values of the two points $A_2$ and $B_2$ across $A_1 B_3$. Only if the difference between the values of Points A2 and B2 is far greater than the average value of the differences of the pixel points on each side of the line $A_1 B_3$ is the line between A1 and B3 determined to be a true edge. In a similar way, whether or not the edge $A_3 B_1$ is a true edge may be determined.

Provided that Points $A_1$ and $B_3$ are fall in and are located at the edge 420, the value of the newly-added pixel 430 will be calculated through the two points of pixels on the edge 420 with by interpolation. As shown in FIG. 6, the pixel value of x is calculated with Formula (2). If the pixel value of Point $A_1$ is $A_1$ and the pixel value of Point $B_3$ is $B_3$, the pixel value of Point x is $(A_1+B_3)/2$. If Points $A_2$ and $B_2$ are located at the edge 420, the pixel value of x is calculated with Formula (3). If the pixel value of Point $A_2$ is $A_2$ and the pixel value of Point $B_2$ is $B_2$, the pixel value of Point x is $(A_2+B_2)/2$. If Points $A_3$ and $B_1$ are located at the edge 420, the pixel value of x is calculated with Formula (4). If the pixel value of Point $A_3$ is $A_3$ and the pixel value of Point $B_1$ is $B_1$, the pixel value of Point x is $(A_3+B_1)/2$ (Step 560).

When more than three points among the adjacent six points corresponding to the internal elements of the edge map are 1, or all of them are 0, $$x_i = \frac{A_1 + A_3 + B_1 + B_3}{4}.$$

As for each newly-added pixel 330 or 430, the values of Y, U, and V or the values of R, G, and B must be calculated. If each point must be calculated three times, obviously more time is taken for calculation. Therefore, a decision mapping table is further added in the memory. When the formula used for adjusting the newly-added pixel 430 is determined for the first time, for example, supposing that after value Y has been calculated, it is concluded that Formula (1) is required for conducting adjustment, the field corresponding to the newly-added pixel 430 in the table is marked as 0. If Formula (2) or (6) is required, the field corresponding to the newly-added pixel 430 in the table is marked as 2. If Formula (3) is required, the field corresponding to the newly-added pixel 430 in the table is marked as 1. If Formula (4) is required, the field corresponding to the newly-added pixel 430 in the table is marked as 3. As such, when the values of U and V of the newly-added pixel 330 or 430 are calculated, the formula corresponding to a marked number in the decision mapping table is directly selected without any determinations.

As mentioned in the above embodiments, provided that the horizontal adjustment multiple is 2.67 and the vertical adjustment multiple is 2.25, an adjusted image with two times enlarged pixel values will be obtained through one interpolation process, i.e., the resolution becomes 1440×960. However, the vertical resolution of the HDTV is 1920×1080, such that the horizontal resolution of the adjusted image will be further adjusted to 1.335 times and the vertical resolution will be adjusted to 1.125 times through the bilinear algorithm. Therefore, a frame with the resolution required by the HDTV can be achieved, and an edge enhancing effect also can be achieved after the image has been adjusted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A composite method for adjusting an image resolution, comprising:

obtaining an original image;

obtaining a scaling factor for adjustment S of the original image;

calculating and generating an adjusted image with a scaling factor equal to $2^n$, wherein n is an integer that makes $S/2^n$ closest to 1; and converting the adjusted image into a final image that is S times the size of the original one, wherein calculating the pixel value of each of newly-added pixels $x_i$ is determined by a top left point $A_1$, a top point $A_2$, a top right point $A_3$, a bottom left point $B_1$, a bottom point $B_2$, and a bottom right point $B_3$, and wherein the points $A_1, A_2, A_3, B_1, B_2,$ and $B_3$ form a set of six adjacent points, and wherein the pixel value of each of the newly-added pixels $x_i$ is obtained through the following determinations:

when more than three points among the adjacent six points corresponding to the internal elements of the edge map are 1, or all of them are 0, $$x_i = \frac{A_{1+}A_3 + B_1 + B_3}{4};$$

otherwise, $$x_i = \frac{(A_1 + B_3)\text{edge } A_1B_3 + (B_1 + A_3)\text{edge } B_1A_3}{2(\text{edge } A_1B_3 + \text{edge } B_1A_3)};$$

wherein edge$A_iB_i$ is a binary code, indicating that whether the edge defined by Point $A_i$ and Point $B_i$ is located on the edge indicted by the edge map.

2. The composite method for adjusting an image resolution as claimed in claim 1, further comprising:

generating an edge map of the original image, the step of generating an edge map being conducted before the step of calculating and generating the adjusted image, wherein the step of calculating and generating the adjusted image with a scaling factor equal to $2^n$ comprises calculating and generating the adjusted image with a scaling factor equal to $2^n$ according to the edge map, and the step of converting the adjusted image into a final image that is S times the size of the original one comprises converting the adjusted image into a final image that is S times the size of the original one according to the edge map.

3. The composite method for adjusting an image resolution as claimed in claim 2, wherein capturing an edge map of the original image is achieved through a Sobel method, a Laplace method, a Robert method, or a second order method.

4. The composite method for adjusting an image resolution as claimed in claim 2, wherein internal elements of the edge map are binary codes.

5. The composite method for adjusting an image resolution as claimed in claim 1, wherein when each of the newly-added pixels $x_i$ is located on the two points that are determined to belong to the edge, the pixel value is the average of the sum of pixel values for the two points on the edge.

6. The composite method for adjusting an image resolution as claimed in claim 1, wherein the pixel values of each of the newly-added pixels $x_i$ are used to determine a decision mapping table.

7. The composite method for adjusting an image resolution as claimed in claim 6, wherein the decision mapping table is used to calculate the values of Y, U, and V or the values of R, G, and B for each of the newly-added pixels $x_i$.

8. The composite method for adjusting an image resolution as claimed in claim 1, further comprising capturing an edge of the original image, and wherein after the edge of the original image has been captured, the original image is divided into a plurality of blocks to be processed one by one.

9. The composite method for adjusting an image resolution as claimed in claim 8, wherein each of the blocks is used to read each of the pixels line by line into a memory for being processed.

10. A composite method for adjusting an image resolution, comprising:

obtaining an original image;

obtaining a scaling factor for adjustment S of the original image;

calculating and generating an adjusted image with a scaling factor equal to $2^n$, wherein n is an integer that makes $S/2^n$ closest to 1;

converting the adjusted image into a final image that is S times the size of the original one; and generating an edge map of the original image, the step of generating an edge map being conducted before the step of calculating and generating the adjusted image, wherein the step of calculating and generating the adjusted image with a scaling factor equal to $2^n$ comprises calculating and generating the adjusted image with a scaling factor equal to $2^n$ according to the edge map, and the step of converting the adjusted image into a final image that is S times the size of the original one comprises converting the adjusted image into a final image that is S times the size of the original one according to the edge map, and wherein the edge map is used to determine whether an edge is true or false through a first algorithm that calculates from the top left to the bottom right, shown as follows:

a first temporary meta value$=|A_2-B_2|-(|B_2-B_1|+|A_2-A_3|)/2$;

if the first temporary meta value is greater than a first threshold value, the edge is true; and otherwise, the edge is false.

11. A composite method for adjusting an image resolution, comprising:

obtaining an original image;

obtaining a scaling factor for adjustment S of the original image;

calculating and generating an adjusted image with a scaling factor equal to $2^n$, wherein n is an integer that makes $S/2^n$ closest to 1;

converting the adjusted image into a final image that is S times the size of the original one; and generating an edge map of the original image, the step of generating an edge map being conducted before the step of calculating and generating the adjusted image, wherein the step of calculating and generating the adjusted image with a scaling factor equal to $2^n$ comprises calculating and generating the adjusted image with a scaling factor equal to $2^n$ according to the edge map, and the step of converting the adjusted image into a final image that is S times the size of the original one comprises converting the adjusted image into a final image that is S times the size of the original one according to the edge map, and wherein the edge map is used to determine whether an edge is true or false through a second algorithm that calculates from the bottom left to the top right, shown as follows:

a second temporary meta value$=|A_2-B_2|-(|A_2-A_1|+|B_2-B_3|)/2$;

if the second temporary meta value is greater than a second threshold value, the edge is true; and otherwise, the edge is false.

12. A composite apparatus for adjusting an image resolution, which is used to obtain an original image, to obtain a scaling factor for adjustment S of the original image, and characterized in that:
   an adjusted image with a scaling factor equal to $2^n$ is calculated and generated; and
   the adjusted image is converted into a final image, which is S times the size of the original one, wherein n is an integer that makes $S/2^n$ closest to 1,
   wherein the calculation of the pixel value of each of newly-added pixels $x_i$ is determined by a top left point $A_1$, a top point $A_2$, a top right point $A_3$, a bottom left point $B_1$, a bottom point $B_2$, and a bottom right point $B_3$, and
   wherein the points $A_1$, $A_2$, $A_3$, $B_1$, $B_2$, and $B_3$ form a set of six adjacent points, and
   wherein the pixel value of each of the newly-added pixels $x_i$ is obtained through the following determinations:
      when more than three points among the adjacent six points corresponding to the internal elements of the edge map are 1, or all of them are 0

$$x_i = \frac{A_1 + A_3 + B_1 + B_3}{4};$$

otherwise, $$x_i = \frac{(A_1 + B_3)\,\text{edge } A_1B_3 + (B_1 + A_3)\,\text{edge } B_1A_3}{2(\text{edge } A_1B_3 + \text{edge } B_1A_3)};$$

wherein edge$A_iB_i$ is a binary code, indicating that whether the edge defined by Point $A_i$ and Point $B_i$ is located on the edge indicted by the edge map.

13. The composite apparatus for adjusting an image resolution as claimed in claim 12, wherein an edge map of the original image is generated, the adjusted image with a scaling factor equal to $2^n$ is calculated and generated according to the edge map, and the adjusted image is converted into the final image according to the edge map.

14. The composite apparatus for adjusting an image resolution as claimed in claim 13, wherein the edge map of the original image is captured through a Sobel method, a Laplace method, a Robert method, or a second order method.

15. The composite apparatus for adjusting an image resolution as claimed in claim 13, wherein the internal elements of the edge map are binary codes.

16. The composite apparatus for adjusting an image resolution as claimed in claim 12, wherein when each of the newly-added pixels $x_i$ is located on two points that are determined to belong to the edge, the pixel value is the average of the sum of pixel values of the two points on the edge.

17. The composite apparatus for adjusting an image resolution as claimed in claim 12, wherein the pixel values of each of the newly-added pixels $x_i$ are used to determine a decision mapping table.

18. The composite apparatus for adjusting an image resolution as claimed in claim 17, wherein the decision mapping table is used to calculate the values of Y, U, and V or the values of R, G, and B for each of the newly-added pixels $x_i$.

19. The composite apparatus for adjusting an image resolution as claimed in claim 12, wherein the apparatus is used to capture an edge of the original image, and wherein the original image is divided into a plurality of blocks to be processed one by one.

20. The composite apparatus for adjusting an image resolution as claimed in claim 19, wherein each of the blocks is used to read each of the pixels line by line into a memory for being processed.

21. A composite apparatus for adjusting an image resolution, which is used to obtain an original image, to obtain a scaling factor for adjustment S of the original image, and characterized in that:
   an adjusted image with a scaling factor equal to $2^n$ is calculated and generated; and
   the adjusted image is converted into a final image, which is S times the size of the original one, wherein n is an integer that makes $S/2^n$ closest to 1,
   wherein an edge map of the original image is generated, the adjusted image with a scaling factor equal to $2^n$ is calculated and generated according to the edge map, and the adjusted image is converted into the final image according to the edge map, and
   wherein the edge map is used to determine whether an edge is true or false through a first algorithm that calculates from the top left to the bottom right, shown as follows:
      a first temporary meta value=$|A_2-B_2|-(|B_2-B_1|+|A_2-A_3|)/2$;
      if the first temporary meta value is greater than a first threshold value, the edge is true; and
      otherwise, the edge is false.

22. A composite apparatus for adjusting an image resolution, which is used to obtain an original image, to obtain a scaling factor for adjustment S of the original image, and characterized in that:
   an adjusted image with a scaling factor equal to $2^n$ is calculated and generated; and
   the adjusted image is converted into a final image, which is S times the size of the original one, wherein n is an integer that makes $S/2^n$ closest to 1,
   wherein an edge map of the original image is generated, the adjusted image with a scaling factor equal to $2^n$ is calculated and generated according to the edge map, and the adjusted image is converted into the final image according to the edge map, and
   wherein the edge map is used to determine whether an edge is true or false through a second algorithm that calculates from the bottom left to the top right, shown as follows:
      a second temporary meta value=$|A_2-B_2|-(|A_2-A_1|+|B_2-B_3|)/2$;
      if the second temporary meta value is greater than a second threshold value, the edge is true; and
      otherwise, the edge is false.

* * * * *